United States Patent
Schmeichel

Patent Number: 6,135,534
Date of Patent: Oct. 24, 2000

[54] TRUCK BOX TARPAULIN HOLD DOWN

[76] Inventor: Charles Milton Schmeichel, P.O. Box 1395, Jamestown, N. Dak. 58402

[21] Appl. No.: 08/825,631

[22] Filed: Mar. 31, 1997

[51] Int. Cl.$^7$ ...................................................... B60P 7/04
[52] U.S. Cl. .............................................. 296/98; 160/243
[58] Field of Search ................................ 296/98, 100.11, 296/100.12; 105/377.02; 160/242, 243, 290.1, 296

[56] References Cited

U.S. PATENT DOCUMENTS

| | | | |
|---|---|---|---|
| Re. 31,746 | 11/1984 | Dimmer et al. | 296/98 |
| 1,199,766 | 10/1916 | Dewstow | 296/98 |
| 1,786,048 | 12/1930 | Williams | 296/98 |
| 2,771,319 | 11/1956 | Renquist | 296/98 X |
| 3,146,824 | 9/1964 | Veilleux | 296/98 X |
| 4,484,777 | 11/1984 | Michel | 296/98 |
| 4,518,193 | 5/1985 | Heider et al. | 296/98 |
| 4,529,098 | 7/1985 | Heider et al. | 220/211 |
| 4,657,062 | 4/1987 | Tuerk | 160/243 |
| 4,691,957 | 9/1987 | Ellingson | 296/98 |
| 4,823,707 | 4/1989 | Salabury et al. | 296/104 X |
| 4,834,445 | 5/1989 | Odegaard | 296/98 |
| 4,915,439 | 4/1990 | Cramaro | 296/98 |
| 5,002,328 | 3/1991 | Michel | 296/98 |
| 5,180,203 | 1/1993 | Goudy | 296/98 |
| 5,211,441 | 5/1993 | Barkus et al. | 296/104 |
| 5,429,408 | 7/1995 | Henning et al. | 296/100 |
| 5,658,037 | 8/1997 | Evans et al. | 296/98 |

FOREIGN PATENT DOCUMENTS 1243062  11/1988  Canada .

*Primary Examiner*—Dennis H. Pedder
*Attorney, Agent, or Firm*—Curtis V. Harr

[57] ABSTRACT

A method of providing secure attachment points for a rollable tarpaulin cover used in open top trailers is provided. This is accomplished by the use of cleats attached to the leading edge of a tarpaulin roll tube or shaft. These cleats engage a gear cog mounted to the side of the trailer when the tarpaulin is fully deployed. This arrangement provides additional points at which the tarpaulin can be secured to the trailer to provide a tight seal over the top of the trailer.

14 Claims, 8 Drawing Sheets

FIG 3
FIG 4
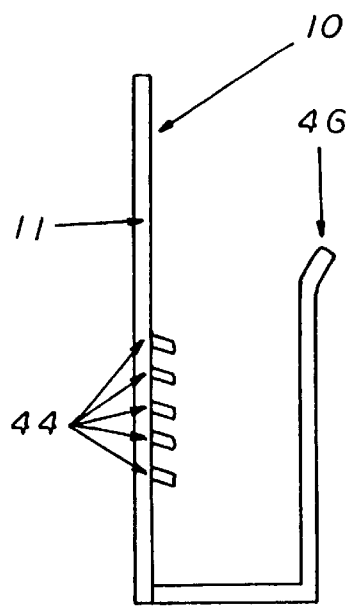
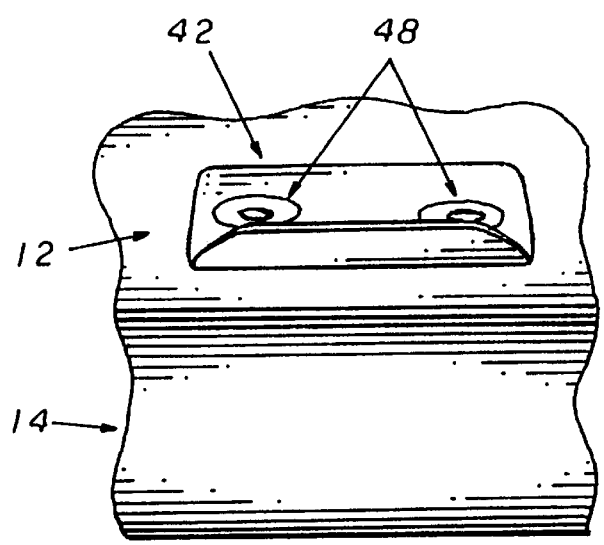

TRUCK BOX TARPAULIN HOLD DOWN

BACKGROUND OF THE INVENTION

The present invention relates to an improvement in a roll tarp covering device employed by truck trailers with an open top configuration used for loading and unloading of materials being transported. More specifically, a device which secures a flexible cover for these types of trailers and protects the materials contained therein from the elements and prevents such material from flying out of the open top trailer while the vehicle is in motion.

In the past, trailers pulled by large trucks or farm equipment have proven to be a desirable method by which a variety of materials can be transported over both long and short distances. For ease in loading and unloading materials these trailers were designed with an open top. This configuration allows certain materials such as sand, gravel, grain and various other types of farm produce, to be poured or dropped into the bin of the trailer by means of commonly used collecting equipment such as augers.

An inherent problem associated with this type of trailer occurs when the truck and trailer are moving at high speeds on the highway during transport. The materials being transported can fly out of the top of the trailer while it is in motion, causing loss of the material and potential damage to other vehicles on the road. Additionally, some materials, especially grains and other produce, must be protected from inclement weather conditions such as rain, snow or hail, which could damage the product by entering the open top of the trailer during transport.

Truck and trailer combinations as described above are generally operated by a single driver. A complicated covering device that requires two or more persons to employ is simply not practical for use by a driver traveling alone. Thus, a suitable covering device must be simple, as well as effective, in order to be of use.

Prior art illustrates various devices which have been used to cover the open portion of the trailer. U.S. Pat. Nos. 3,397,009, 3,498,666, 3,854,770 and 4,030,780 all employ a tarpaulin which is attached on one edge to a tube-like shaft or roll tube, which is in turn mounted to the upper edge of one side of the trailer at its forward most and rearmost points. These are commonly known as roll tarpaulins. When the device is not in use, the tarpaulin is rolled around the shaft and stored on the edge of the trailer to which the tarpaulin is permanently attached. When employed, commonly with a manual crank and handle, the shaft is rolled across the open top of the trailer, unrolling the tarpaulin to cover the top of the trailer. When the shaft apparatus reaches the opposite side of the trailer, the tarpaulin is completely unrolled, and provides a cover for the top of the trailer. The shaft is then fastened to the opposite edge of the trailer at various points, commonly the forward most and rearmost points. Thus, the fully unrolled tarpaulin is secured to the edge of the trailer along one side and at the front and back corners on the other side.

The prior art designs employ various methods of rolling and unrolling the tarpaulin and attaching to the tarpaulin to the trailer. However, all of these designs share a common flaw. This flaw is a result of the tarpaulin only being connected to the top of the trailer at the two corners on the opposite side, thus the shaft to which the tarpaulin is attached can bend upwards when the vehicle is in motion. This allows air to enter the enclosed trailer and push the tarpaulin upward, preventing a tight fit of the tarpaulin over the top of the trailer. This problem can also allow rain, snow or other elements, to enter the trailer, and in extreme situations, destroy the tarpaulin and shaft. Further complicating this problem is the fact that often trucks are heaped full and will have different sizes of peaks from the contents along the length of the truck box. This will cause the tension on the tarpaulin and shaft to vary along its length. For example if a large load of grain is placed in the middle of the truck box creating a peak of grain which rises above the walls of the box, then the tarp is subsequently unrolled over this pile with the forward and rearward ends of the tarp being fastened at a given tension, the peak of grain will cause the tarp to be tighter about this portion. Thus, the shaft will often bow in the middle. One solution has been the use of stronger shafts, however, this increases weight and also the cost of the tarpaulin. A second solution used in solving this problem has been to supply straps at various intervals along the shaft. Along with these straps, latches are placed on the sides of the truck box these latches are aligned with the straps. In this configuration, the truck operator must manually connect the straps to the latches and tighten the straps to draw the tarpaulin into a taught position over the truck box. In order to roll the tarp open, the operator must then exit the truck and unlatch the straps.

A still further solution has been to provide the edge of the truck box with a lip. When the tarp is completely unrolled, the shaft travels under this lip so that subsequent turns of the shaft draws it under the lip. The problem with this design is that it does not account for various load sizes along the length of the truck box. Thus, an even tension cannot be placed on the tarp at various points.

Recently, many truck boxes have been equipped with electric tarpaulins that may be rolled and unrolled conveniently from the cab using an electric motor commonly placed at one end of the shaft. Electric tarpaulins also suffer from the same problems as encountered on manual roll tarpaulins as described above. Further, the use of hold down straps with electric tarpaulins is self defeating as the operator must exit the cab of the truck in order to secure an unrolled tarp or to release a tarp prior to uncovering the truck.

Pursuant to the foregoing discussion, it can be seen that it would be desirable to provide a method to cover the top of an open top trailer which would provide a tight fit, preventing air and rain from entering the trailer while it is in motion. It would also be desirable to provide a means of securing a roll tarp in a covered position without manual operation of latches or straps. Finally, it would be desirable to provide a means of holding the roll tarp shaft at various intervals. This means would need to firmly hold the tarpaulin shaft, yet it must account for bowing in the shaft caused by an uneven load while still holding the shaft at various points with sufficient tension.

This is accomplished by means of cleats employed at various points along the edge of the trailer to which the shaft is moved in deploying the tarpaulin. These cleats provide additional points to which the tarpaulin and shaft are attached, preventing large bends in the shaft yet allowing for various tensions along the length of the shaft caused by uneven loading of the truck box.

SUMMARY OF THE INVENTION

It is the primary objective of the present invention to provide a means to secure the tarpaulin and shaft in their closed position such that a tight seal is formed, thus preventing air, rain and snow from entering the trailer.

It is an additional objective of the present invention to provide a means for unrolling the tarpaulin that is simple and can be accomplished by a single person without manual engagement or disengagement of devices such as straps and latches.

It is a still further objective of the present invention to provide a means of holding a roll tarpaulin shaft at various intervals. This means firmly engages the tarpaulin shaft yet it can account for bowing in the shaft caused by an uneven load. This means can also hold the shaft at various points with sufficient tension.

These objectives are accomplished by the use of one or more cleats attached to the leading edge of the tarpaulin roll tube which engage an equal plurality of gear cogs mounted in corresponding positions to the side of the trailer when the tarpaulin is fully deployed. This arrangement provides additional points at which the tarpaulin can be secured to the trailer to provide a tight seal over the top of the trailer.

More specifically, the truck box tarpaulin hold down is supplied by attaching a flat rectangular plate to the side of a truck or trailer box to be covered. On one half of the plate a plurality of gripping cleat cogs that extend outward are supplied. These cleat cogs may extend at a right angle to the plate or at a slight angle downward therefrom. Further, a single cleat cog maybe used, however, in most situations a plurality of cleat cogs would be used to allow for adjustment. These cleat cogs may be attached to the plate or formed from the plate by punching a louver shaped section outward from the plate. At the opposite side of the rectangular plate is attached a roll tube retainer bracket. This component is generally "L" shaped with the shorter portion of the "L" attaching to and extending outward from the rectangular plate. The longer portion of the "L" then extends upward and forms a parallel surface to that of the rectangular plate, thereby forming a bracket in conjunction with the rectangular plate. A "j" shaped configuration would function equally as well. Finally, one or more gripping cleats are attached to the tarpaulin shaft with rivets, bolts or other suitable fastening means.

When the tarpaulin is fully deployed by use of the roll tube, it rests in a position in which the tarpaulin gripping cleats are precisely aligned with the gripping cleat cogs located on the rectangular plate. As the tarpaulin roll tube is moved down it first engages the roll tube retainer bracket. The roll tube retainer bracket serves to keep the tarpaulin roll tube from moving away from the rectangular plate. Subsequent rolls cause the cleat to engage one of the cleat cogs and thus, to secure the roll tube and tarp in a covered or closed position.

For a better understanding of the present invention reference should be made to the drawings and the description in which there are illustrated and described preferred embodiments of the present invention.

DESCRIPTION OF THE DRAWINGS

FIG. 3 is a side elevation view of the present invention showing the orientation of its major components.

FIG. 4 is a front elevation cut-away view of the present invention showing the orientation of the gripping cleat component of said invention as it is located on the leading edge of the tarpaulin.

DESCRIPTION OF THE PREFERRED EMBODIMENT

Figure 1:
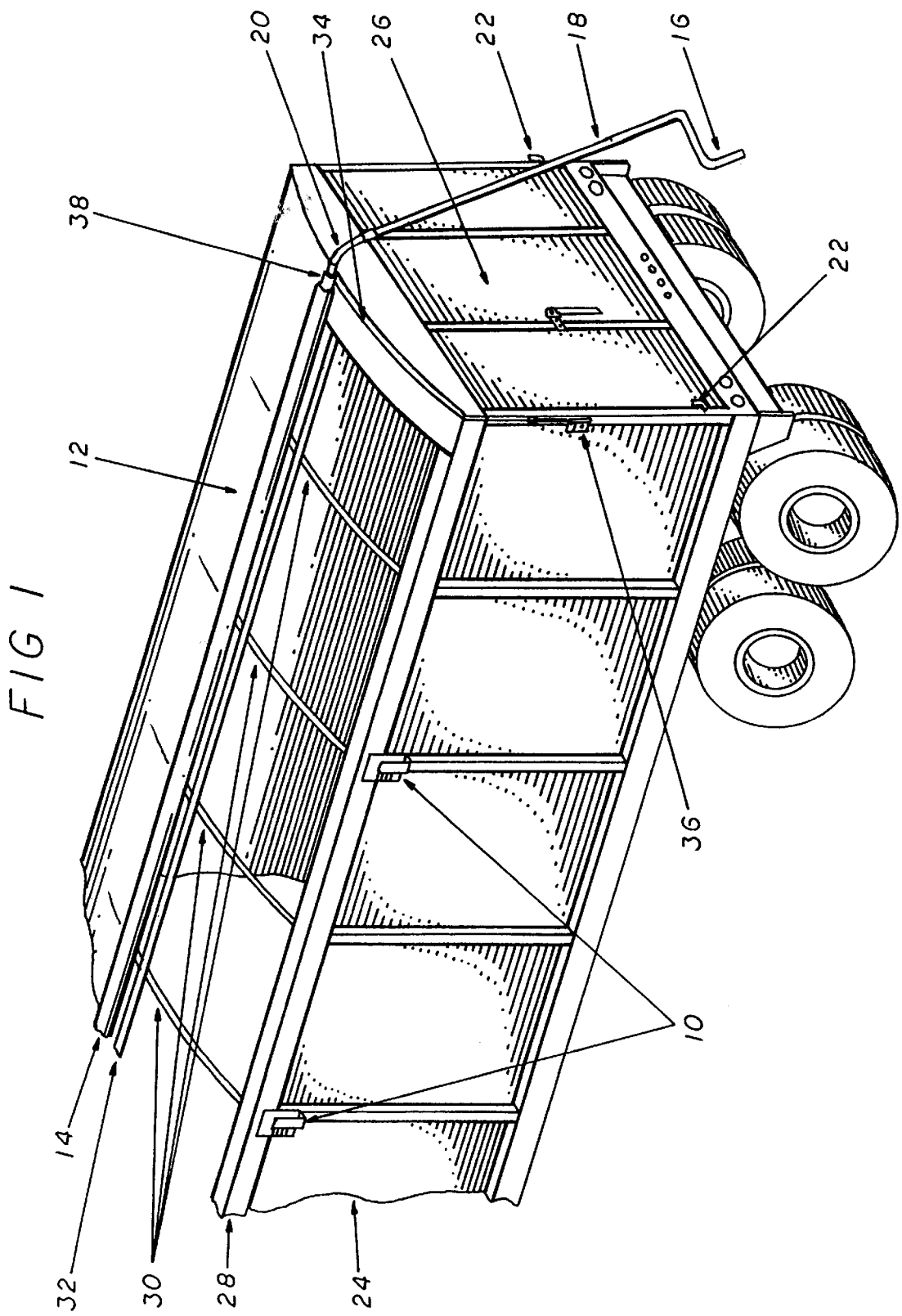
FIG. 1 is a perspective view of the uniform tension truck box tarpaulin hold down showing the manner of its use in conjunction with an open top trailer and the orientation of said invention in relation to the open top trailer.

Referring now to the drawings, and more specifically to FIG. 1, the Truck Box Tarpaulin Hold Down 10 mounts to the open truck box 24 in a plurality of locations on the open truck box upper side frame 28. The open truck box upper side frames 28 are spanned at their upper surfaces by the tarpaulin support bows 30 which bow in a upward direction in relation to the open truck box 24 and provide the frame work upon which the tarpaulin 12 rests in its unrolled position. Additionally, the tarpaulin support bows 30 are spanned horizontally by the center ridge strut 32 which supplies longitudinal integrity to the tarpaulin support bows 30.

The tarpaulin 12 can be then rolled or unrolled over the above described structure by the use of the tarpaulin roll tube 14. The tarpaulin roll tube 14 also serves the purposes of providing longitudinal integrity to the unrolled, or covered position, and as storage for the tarpaulin 12 in the rolled, or uncovered position. At its most reward end, the tarpaulin roll tube 14 is connected to the tarpaulin crank handle 16 and the tarpaulin crank shaft 18 through the crank handle universal flex hose 20, or a common knuckle. The crank handle universal flex hose 20, or knuckle provides, an effective way of transferring the diagonal rotational force applied at the tarpaulin crank handle 16 and to the horizontal tarpaulin roll tube 14 in order to roll and unroll the tarpaulin 12. The crank handle 16 may be secured when not in use by attaching it to one of the crank handle attachment brackets 22 located on either side of the open truck box end gate 26.

The roll tube guide wire 34 that may typically be used attaches to the most reward portion of the tarpaulin roll tube 14 at the guide wire collection spool 38 just forward of the crank handle universal flex hose 20, the guide wire 34 and guide wire collection spool 38 are also supplied at the most forward portion of the tarpaulin roll tube 14 in order to act evenly on both ends of the tarpaulin roll tube 14. The guide wire collection spool 38 serves as a collection area for the undeployed portion of the roll tube guide wire 34 as the tarpaulin is rolled or unrolled over the open truck box 24. The roll tube guide wire 34 is then permanently attached at its other end to the guide wire attachment clamp 36 which is located on the extern surface of the open truck box 24 just below the upper side frame 28. The roll tube guide wire ensures that the tarpaulin will roll and unroll evenly and consistently, thus providing the proper coverage of the open truck box 24.

Figure 2:
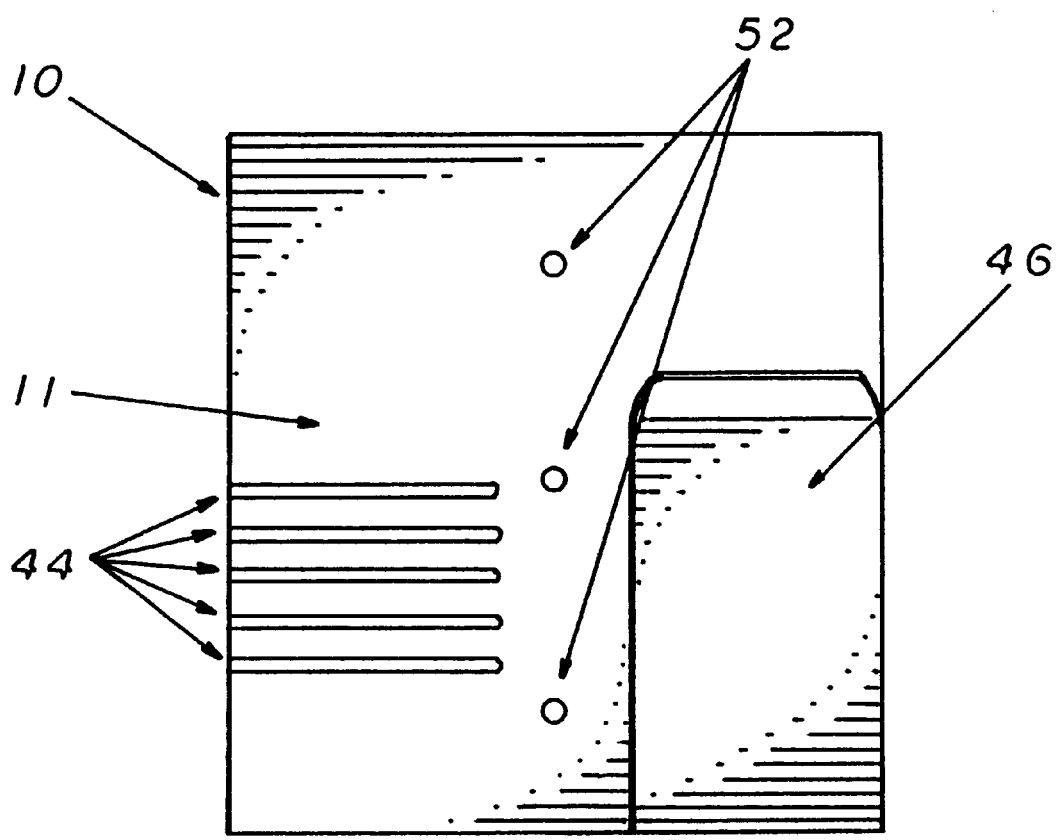
FIG. 2 is a front elevation view of the present invention showing the orientation of its major components.

The method of construction and the major components of the truck box tarpaulin hold down 10 are shown by FIGS. 2, 3, and 4. The truck box tarpaulin hold down 10 comprises a flat rectangular plate 11 with a plurality of attachment holes 52 located along the longitudinal axis of the center of said rectangular plate 11. On one side of the attachment holes 52 are located a plurality of gripping cleat cogs 44 which are attached to the rectangular plate 11 and extend outward and ideally at a slight downward angle therefrom.

At the opposite side of the rectangular plate 11 is attached the role tube retainer bracket 46. This component is generally "L" shaped, or outward and upward, with a first portion attached to and extending outward from the rectangular plate 11. The second portion of the role tube retainer bracket 46 extends upward and generally forms a parallel surface to that of the rectangular plate 11, thereby forming a bracket in conjunction with said rectangular plate 11. Finally, the tarpaulin gripping cleat 42 is attached to the tarpaulin roll tube 14 by means of the cleat attachment rivets 48, or other suitable fasteners.

Figure 5:
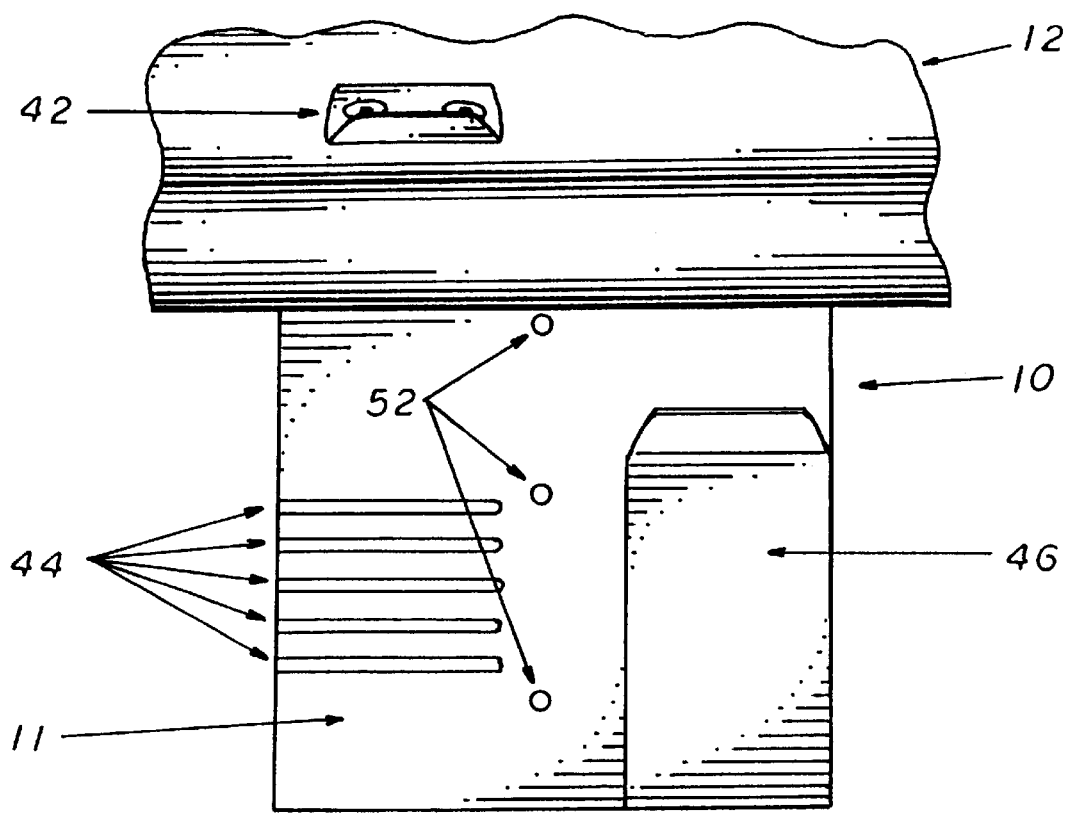
FIG. 5 is a front elevation view of the present invention showing the orientation of the gripping cleat and tarpaulin in relation to said invention just prior to engagement of the cleat to the cleat cogs.
Figure 6:
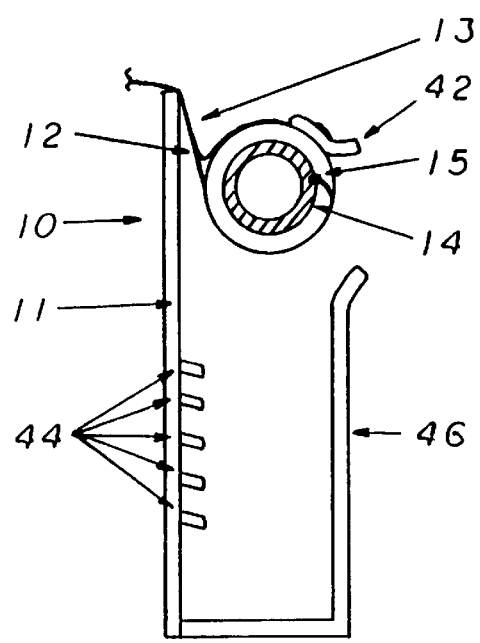
FIG. 6 is a side elevation view of the present invention showing the orientation of the gripping cleat and tarpaulin in relation to said invention just prior to engagement of the cleat to the cleat cogs.
Figure 7:
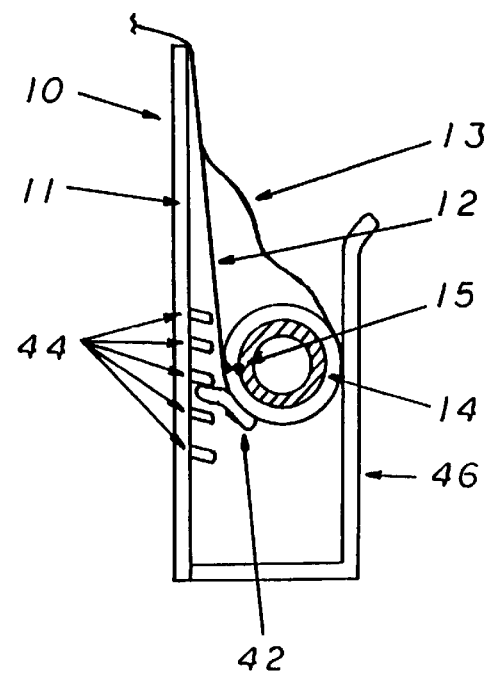
FIG. 7 is a side elevation view of the present invention showing the orientation of the gripping cleat and tarpaulin in relation to said invention after engagement of the cleat to the cleat cogs.

The manner in which the uniform tension truck box tarpaulin hold down 10 operates is depicted in FIGS. 5, 6, and 7. When the tarpaulin 12 is fully deployed by use of the roll tube 16, it rests in a position in which the tarpaulin gripping cleat 42 is precisely aligned with the gripping cleat cogs 44 located on the rectangular plate 11. As the tarpaulin roll tube 14 is moved down it first engages the roll tube retainer bracket 46. The roll tube retainer bracket 46 serves to keep the tarpaulin roll tube 14 from moving away from the rectangular plate 11. This design feature also ensures that the gripping cleat 42 does not disengage from the gripping cleat cogs 44 while the tarpaulin is pulled tight upon the open truck box 24.

Once the tarpaulin gripping cleat 42 engages the gripping cogs 44, the tarpaulin attachment point 15 is such that further tension on the tarpaulin 12, such as wind or material pressure, will have the effect of further forcing the tarpaulin gripping cleat 42 in contact with the gripping cogs 44. A protective overlay 13 is used to extend from the tarpaulin attachment point 15, around the backside of the tarpaulin roll tube 14 and connecting to the tarpaulin 12. In this configuration the protective overlay 13 is used to prevent the accumulation of snow or other debris between the tarpaulin 12 and the roll tube 14, when the tarpaulin 12 is in the unrolled position as shown by FIG. 7. The roll tube retainer bracket 46 serves to keep the tarpaulin roll tube 14 from moving away from the rectangular plate 11. The plurality of gripping cogs 44 allow for variations in bowing of the roll tube 14.

Figure 8:
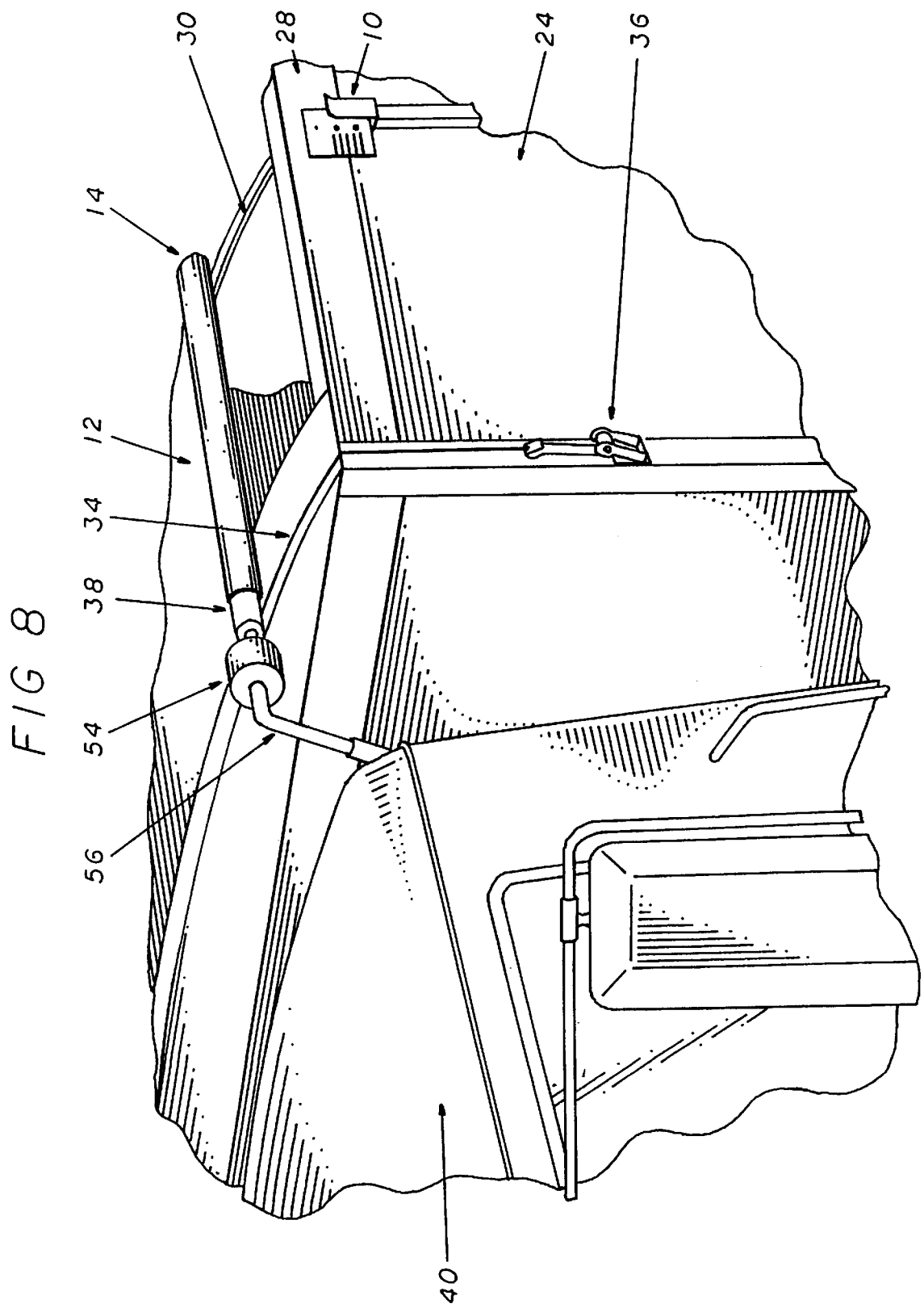
FIG. 8 is a perspective view of an alternative embodiment of the present invention in which an electric motor is mounted to said invention in order to automate the rolling and unrolling of said tarpaulin.

An alternative embodiment or use of the truck box tarpaulin hold down 10 is illustrated by FIG. 8. In this configuration, the unrolling and rolling of the tarpaulin 12 is accomplished by the use of an electric roll motor 54. The electric roll motor 54 is attached to the front end of the tarpaulin roll tube 14 just in front of the guide wire 34 and guide wire collection spool 38. The most forward end of the electric roll motor 54 is also attached to the telescoping control arm 56 which helps to stabilize the electric roll motor 54 during its movement along the open truck box 24 in the rolling and unrolling of the tarpaulin 12. The major advantage of this embodiment is that it allows for the covering of the open truck box 24 from the inside of the truck cab 40.

Figure 9:
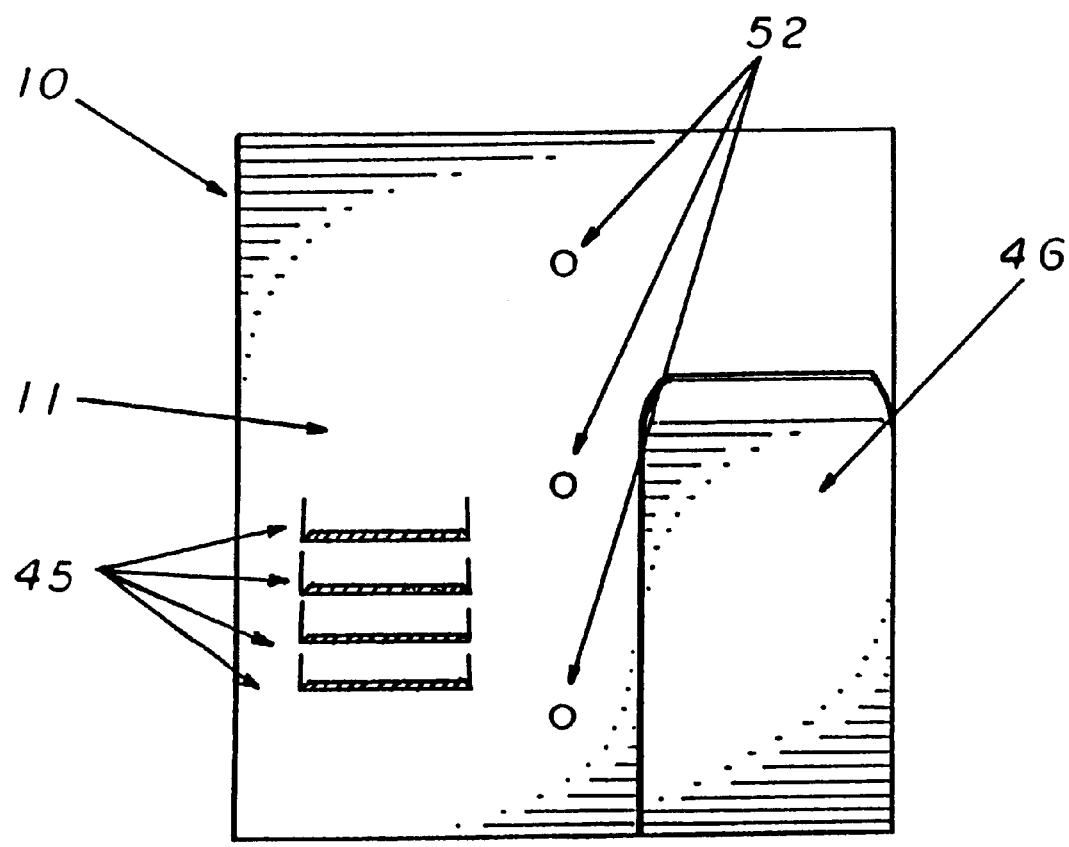
FIG. 9 is a front elevation view of an alternative embodiment of the present invention in which the cleat cogs are formed by punching out a portion of the rectangular plate.
Figure 10:
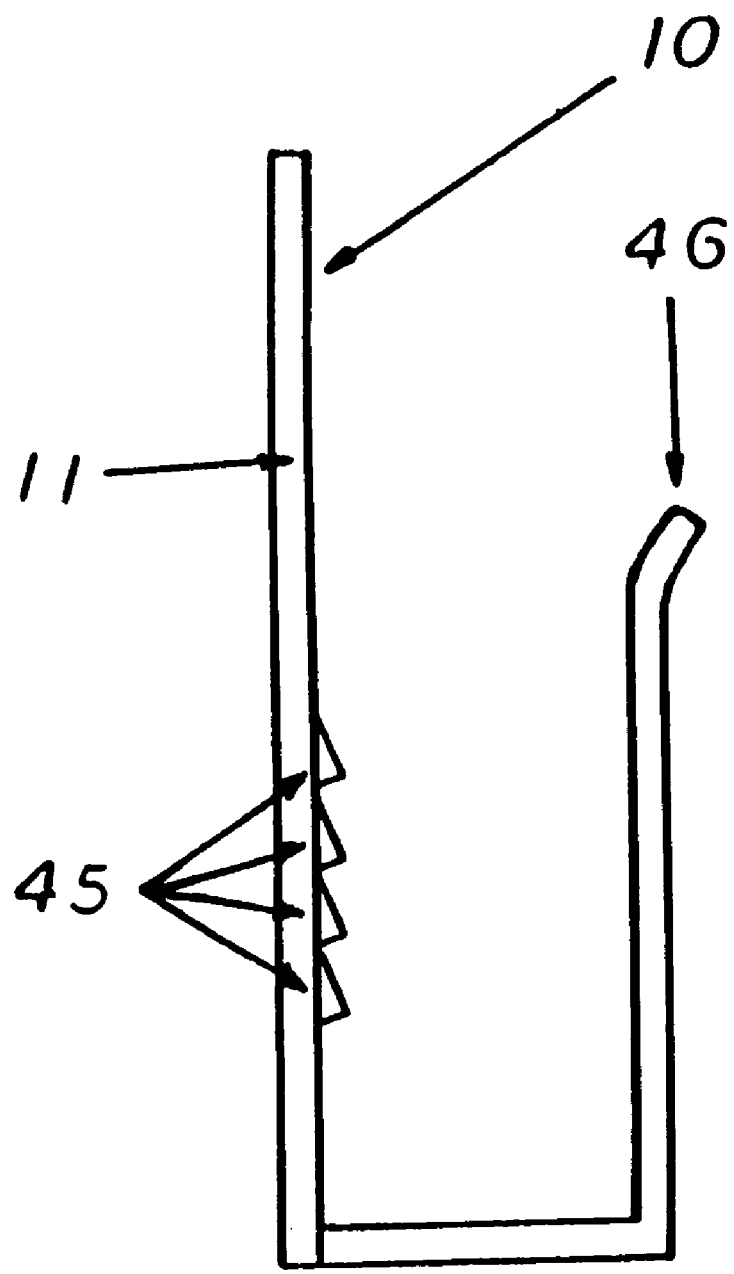
FIG. 10 is a side elevation view of an alternative embodiment of the present invention in which the cleat cogs are formed by punching out a portion of the rectangular plate.

An alternative embodiment of the rectangular plate 11 is illustrated in FIGS. 9 and 10. The truck box tarpaulin hold down 10 comprises a flat rectangular plate 11 with a plurality of attachment holes 52 located along the longitudinal axis on the center of said rectangular plate 11. On one side of the attachment holes 52 are located a plurality of louvered gripping cleat cogs 45 which are formed by punching a louver shaped portion outward from the rectangular plate 11. This configuration simplifies the production of the Truck Box Tarpaulin Hold Down 10 by allowing the louvered gripping cleat cogs 45 to be formed directly from the rectangular plate 11.

Although the present invention has been described in considerable detail with reference to certain preferred versions thereof, other versions are possible. Therefore, the spirit and scope of the appended claims should not be limited to the description of the preferred versions contained herein.

What is claimed is:

1. A tarpaulin hold down for use on a flexible sheet used to cover a rectangular box having a pair of opposite end walls and a pair of opposite first and second side walls, said box having a top opening adjacent the upper edges of said end and side walls, with said flexible sheet having first and second opposite edges and being anchored at said first edge to the first of said side walls adjacent said upper edge, said flexible sheet having a elongated shaft anchored about said second edge, said sheet being positioned so as to be rolled about said shaft to expose said box opening or to be unrolled from said shaft to cover said box opening with said tarpaulin hold down comprising:

a plurality of substantially rigid cleats fixably fastened to said elongated shaft used to roll and unroll said flexible sheet with said cleats extending outwardly from said elongated shaft at a fixed angle; and a plurality of plate sections having at least one cleat cog means extending outward from each of said plate sections, said plate sections being fixedly attached to the second box side wall with each of said plate sections of said cleat cogs means being in line with said cleats so as to allow said cleats to engage said cleat cog means when said flexible sheet is in an unrolled position.

2. A tarpaulin hold down as in claim 1 further comprising an upwardly extending shaft retainer means.

3. A tarpaulin hold down as in claim 2 wherein said cleat cog means are comprising plural cleat cogs aligned parallel to each other on a respective plate section.

4. A tarpaulin hold down as in claim 3 wherein said shaft retainer means is a bracket attached to each said plate section adjacent to said cleat cog means and extending outward and upward from said plate.

5. A tarpaulin hold down as in claim 4 wherein each of said cleat cog means is fixedly attached to and extends outward and at an angle slightly downward from said plate section.

6. A tarpaulin hold down as in claim 1 wherein said flexible sheet is manually rolled about said elongated shaft.

7. A tarpaulin hold down as in claim 1 wherein said flexible sheet is rolled about said elongated shaft with an electric motor.

8. A tarpaulin hold down as in claim 4 wherein each of said cleat cog means is an outward louver portion formed from said plate section.

9. A roll tarpaulin hold down for use on a flexible sheet rolled about an elongated shaft and used to cover a box having sides, with said tarpaulin hold down comprising:

at least two or more substantially rigid cleats fixably fastened to said elongated shaft and projecting outwardly from said shaft at a fixed angle;

at least two or more plates fixedly fastened to the second side of said box;

a means of engaging said cleats on each of said plates; and a means of holding said shaft against said box.

10. A tarpaulin hold down as in claim 9 wherein said means of holding said shaft against said box is a bracket attached to said plate and extending outward and upward from said plate.

11. A tarpaulin hold down as in claim 10 wherein said means of engaging said cleats is a plurality of cleat cogs aligned parallel to said cleats and adjacent to each other, said cleat cogs extending outward and at a slight downward angle from said plate.

12. A tarpaulin hold down as in claim 10 wherein said means of engaging said cleats is a plurality of louver shaped portions formed from said plate.

13. A tarpaulin hold down as in claim 9 wherein said flexible sheet is manually rolled about said elongated shaft.

14. A tarpaulin hold down as in claim 9 wherein said flexible sheet is rolled about said elongated shaft with an electric motor.

* * * * *